(12) United States Patent
Chien et al.

(10) Patent No.: US 12,116,431 B2
(45) Date of Patent: Oct. 15, 2024

(54) LIGHT-CURING RESIN COMPOSITION, THREE-DIMENSIONAL OBJECT CONTAINING THE SAME, AND MANUFACTURING METHOD OF THREE-DIMENSIONAL OBJECT

(71) Applicant: Industrial Technology Research Institute, Hsinchu (TW)

(72) Inventors: Pei-Chi Chien, Hsinchu County (TW); Ping-Chen Chen, Hsinchu County (TW); Yaw-Ting Wu, Hsinchu County (TW); Ching-Sung Chen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 48 days.

(21) Appl. No.: 17/571,572

(22) Filed: Jan. 10, 2022

(65) Prior Publication Data
US 2023/0059558 A1    Feb. 23, 2023

(30) Foreign Application Priority Data
Aug. 17, 2021 (TW) ................. 110130382

(51) Int. Cl.
| | | |
|---|---|---|
| *C08F 2/50* | (2006.01) | |
| *B29C 64/129* | (2017.01) | |
| *B29C 64/165* | (2017.01) | |
| *B33Y 10/00* | (2015.01) | |
| *B33Y 70/00* | (2020.01) | |
| *C08F 2/38* | (2006.01) | |
| *C08F 220/18* | (2006.01) | |
| *C08F 220/34* | (2006.01) | |
| *C08K 5/5397* | (2006.01) | |
| *C08K 7/22* | (2006.01) | |
| *B33Y 80/00* | (2015.01) | |

(52) U.S. Cl.
CPC .............. *C08F 2/50* (2013.01); *B29C 64/129* (2017.08); *B29C 64/165* (2017.08); *B33Y 10/00* (2014.12); *B33Y 70/00* (2014.12); *C08F 2/38* (2013.01); *C08F 220/1811* (2020.02); *C08F 220/343* (2020.02); *C08K 5/5397* (2013.01); *C08K 7/22* (2013.01); *B33Y 80/00* (2014.12); *C08K 2201/003* (2013.01)

(58) Field of Classification Search
USPC .......................................... 522/97
See application file for complete search history.

(56) References Cited

U.S. PATENT DOCUMENTS

| | | | |
|---|---|---|---|
| 4,788,230 A * | 11/1988 | Mudge | C08J 3/212 |
| | | | 264/DIG. 6 |
| 10,822,464 B2 | 11/2020 | Liu et al. | |
| 2015/0138289 A1* | 5/2015 | Lijima | B41J 11/00214 |
| | | | 347/102 |
| 2018/0162052 A1 | 6/2018 | Pearlson | |

FOREIGN PATENT DOCUMENTS

| | | | |
|---|---|---|---|
| CN | 110770295 | | 2/2020 |
| CN | 110891795 | | 3/2020 |
| CN | 111748313 | | 10/2020 |
| CN | 112639007 | | 4/2021 |
| CN | 113683732 A | * | 11/2021 |
| TW | 201725091 | | 7/2017 |
| TW | 201905136 | | 2/2019 |
| TW | 201906222 | | 2/2019 |
| WO | 2020028232 | | 2/2020 |

OTHER PUBLICATIONS

"Office Action of Taiwan Counterpart Application", issued on Apr. 13, 2022, p. 1-p. 5.
N. Gama et al., "3D printed cork/polyurethane composite foams", Materials and Design, Oct. 5, 2019, pp. 1-9.
David M. Wirth et al., "Highly Expandable Foam for Lithographic 3D Printing", ACS Applied Materials & Interfaces, Apr. 8, 2020, pp. 19033-19043.
Hiroki Kaimoto et al., "ExpandFab: Fabricating Objects Expanding and Changing Shape with Heat", Creating and Changing Shapes, Feb. 12, 2020, pp. 153-164.

* cited by examiner

*Primary Examiner* — Sanza L. McClendon
(74) *Attorney, Agent, or Firm* — JCIPRNET

(57) ABSTRACT

A light-curing resin composition, a three-dimensional object containing the same, and a manufacturing method of the three-dimensional object are provided. The light-curing resin composition includes a photoinitiator, an acrylic oligomer, an acrylic monomer, and expandable particles with hollow spherical shell structures. The acrylic monomer is a monofunctional monomer, a difunctional monomer, or a combination thereof.

14 Claims, No Drawings

LIGHT-CURING RESIN COMPOSITION, THREE-DIMENSIONAL OBJECT CONTAINING THE SAME, AND MANUFACTURING METHOD OF THREE-DIMENSIONAL OBJECT

CROSS-REFERENCE TO RELATED APPLICATION

This application claims the priority benefit of Taiwanese application no. 110130382, filed on Aug. 17, 2021. The entirety of the above-mentioned patent application is hereby incorporated by reference herein and made a part of this specification.

TECHNICAL FIELD

The technical field relates to a light-curing resin composition, a three-dimensional object containing the same, and a manufacturing method of the three-dimensional object.

BACKGROUND

Three-dimensional (3D) printing technology has been widely applied to products in various fields since its advent. For example, in industries of protective gears such as helmets, knee pads, wrist guards, and the like, customized products may be manufactured through three-dimensional printing to provide protective, comfortable, and lightweight products. In addition, with properties of both customized structures and expandable materials, the technology may also be applied to materials of polishing pads which function with polishing liquid in the semiconductor polishing process, and may reduce defects and improve polishing efficiency through the three-dimensional structure design. On the other hand, with the rapid development of shoemaking technology, the three-dimensional printing technology has also been applied to the shoemaking industry for having advantages in manufacturing shoes with its high level of customization. For example, through the three-dimensional printing parameter design, fully customized products may be provided in accordance with different foot shapes for fit shoe shapes. Based on this, industries relating to three-dimensional printed footwear have boomed in recent years, and the overall demand for materials of additive manufacturing (AM) in the shoemaking industry has also continued to increase, especially the demand for customized midsole materials and protective gears in three-dimensional structure shoes in the market. However, at present, due to the high density, three-dimensional printed objects cause heavy body burden when worn, and the printing speed is slow, which makes it difficult to reduce production costs.

Based on the above, how to design materials, lower the density of three-dimensional printed objects, reduce production costs, and enhance product production speed becomes increasingly important.

SUMMARY

The disclosure provides a light-curing resin composition, a three-dimensional object, and a manufacturing method of the three-dimensional object, which may be used to manufacture a three-dimensional object with high expansion ratio, low density, and light weight, and may further enhance product production speed and reduce production costs.

The light-curing resin composition of the disclosure includes a photoinitiator, an acrylic oligomer, an acrylic monomer, and expandable particles with hollow spherical shell structures. The acrylic monomer is a monofunctional monomer, a difunctional monomer, or a combination thereof.

The manufacturing method of the three-dimensional object of the disclosure is, for example, a method of producing a three-dimensional object by additive manufacturing, including the following steps. The light-curing resin composition is provided and molded by a three-dimensional printing process. In following, a heat treatment is performed to a molded object molded by the three-dimensional printing process to form the three-dimensional object, and the three-dimensional object has a closed-cell hollow structure.

The three-dimensional object of the disclosure is formed by the method of producing the three-dimensional object by additive manufacturing, and the three-dimensional object has the closed-cell hollow structure.

Based on the above, the disclosure provides a light-curing resin composition, a three-dimensional object, and a method of producing the three-dimensional object by additive manufacturing. The three-dimensional printing process may achieve the function design of shoe materials and protective gears at different positions with three-dimensional structures without using molds, and may manufacture customized structure objects, which may better meet individual requirements. In addition, the light-curing resin composition of the disclosure includes a monofunctional monomer, a difunctional monomer, or an acrylic monomer combining the two. When used in the method of producing the three-dimensional object by additive manufacturing of the disclosure, the light-curing resin composition may directly perform secondary shaping by heating and expanding without heating and secondary cross-linking after molded by the dimensional printing process. In this way, the time for three-dimensional printing, expanding, and shaping the object may be reduced to enhance the product production speed and further reduce the production costs. On the other hand, the three-dimensional object of the disclosure has enlarged volume, low density, and light weight, and may reduce body burden with the closed-cell hollow structure when worn.

Several exemplary embodiments are described in detail below to further describe the disclosure in details.

DESCRIPTION OF THE EMBODIMENTS

Hereinafter, embodiments are described in detail as follows, but the embodiments provided are not used to limit the scope of the disclosure. In addition, terms "comprise", "include". "have", and the like used herein are all open-ended terms, namely meaning "including but not limited to".

Herein, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

The disclosure provides a light-curing resin composition, including a photoinitiator, an acrylic oligomer, an acrylic monomer, and expandable particles with hollow spherical shell structures. Hereinafter, the above various components are described in detail.

<Photoinitiator>

The photoinitiator of the disclosure may include a free radical photoinitiator and a cationic photoinitiator, for example, the free radical photoinitiator. In this embodiment, the photoinitiator may include acyl phosphine oxide compounds, for example but not limited to, 2,4, 6-trimethylbenzoyl diphenylphosphine oxide or 2-hydroxy-2-methylpropiophenone. In more detail, the photoinitiator may include compounds such as benzophenone, benzoin ethers, benzil, diethoxy acetophenone, acyl phosphine oxides and bis acyl phosphine oxides, phosphine oxide, or phenyl bis(2,4,6-trimethylbenzoyl) 1-hydroxy-cyclohexylphenyl ketone, but the disclosure is not limited thereto. Based on a total weight of the light-curing resin composition, a content of the photoinitiator is, for example, approximately 0.05 wt % to 10 wt %.

<Acrylic Oligomer>

The acrylic oligomer of the disclosure may include polyurethane acrylate, polyester acrylate, or epoxy acrylate. Based on the total weight of the light-curing resin composition, a content of the acrylic oligomer is, for example, approximately 10 wt % to 80 wt %. When the content proportion of the acrylic oligomer in the light-curing resin composition is excessively high (based on a total weight of the acrylic oligomer and the acrylic monomer when the content of the acrylic oligomer is more than 80 wt %), the heated material is unlikely to have a complete appearance, or has low expansion ratio, and generates cracks on the surface after expansion. Moreover, the overall viscosity of the formula is usually relatively high, which is not easy for operation.

<Acrylic Monomer>

The acrylic monomer of the disclosure is a monofunctional monomer, a difunctional monomer, or a combination thereof. If a trifunctional monomer or a tetrafunctional monomer is used, due to the excessively high cross-linking degree, which leads to a distorted and loose surface shape after expansion, the effect of volume increase after expansion of the disclosure cannot be achieved. In this embodiment, the monofunctional monomer is, for example but not limited to, isobornyl acrylate, acryloyl morpholine, or a combination thereof. In more detail, the monofunctional monomer may also be 2(2-ethoxyethoxy) ethyl acrylate (EOEOEA), tetrahydrofurfuryl acrylate (THFA), stearyl methacrylate, lauryl acrylate (LA), ethyl acrylate, glycidyl methacrylate, or other monofunctional monomers, but the disclosure is not limited thereto. The difunctional acrylic monomer may be tripropylene glycol diacrylate (TPGDA), 1,6 hexanediol diacrylate (HDDA), ethylene glycol dimethacrylate, or the like, but the disclosure is not limited thereto. Based on the total weight of the light-curing resin composition, a content of the acrylic monomer is, for example, approximately 20 wt % to 99 wt %. In more detail, the weight ratio of the acrylic oligomer to acrylic monomer is less than 4, or less than 3. When the acrylic monomer is the combination of the monofunctional monomer and the difunctional monomer, based on the total content of the acrylic monomer, a content of the difunctional monomer is less than 80 wt %, or less than 60 wt %. When the content proportion of the difunctional monomer is excessively high (based on the total content of the acrylic monomer when the content of the difunctional monomer is more than 80 wt %), the heated material is unlikely to have a complete appearance, or has low expansion ratio.

<Expandable Particles>

The expandable particles of the disclosure have hollow spherical shell structures, and a spherical shell material of the hollow spherical shell structures may include acrylate or polyurethane. The hollow spherical shell structures may include air or small molecular hydrogen alkanes. In this embodiment, a particle size of the expandable particles is, for example, approximately 10 μm to 200 μm. Based on the total weight of the light-curing resin composition, a content of the expandable particles is, for example, approximately 1 wt % to 40 wt %. In more detail, by adjusting the proportion of the added expandable particles, the expansion ratio of the object after expansion may be controlled.

<Other Constituents>

For improving printing properties of the formula in additive manufacturing, an additive such as a chain transfer agent, a chain extender, a UV absorber, a thermal initiator, an antioxidant, or the like may be added to the material composition of the light-curing resin composition of the disclosure. In more detail, the chain transfer agent may include, for example, mercaptan, dodecyl mercaptan DDM, alkyl halides, or the like. The chain extender, for example, may use a compound containing active hydrogen to react with an isocyanate end group prepolymer to extend the molecular chain diffusion. The UV absorber may convert high-energy UV light energy into thermal energy or non-destructive longer light waves for release, thereby protecting substances added with the UV absorbent from being damaged by UV radiation. The UV absorber may be divided into benzotriazole, benzophenone, and triazine. The thermal initiator may be, for example, a free radical initiator, which may include halogen (chlorine and bromine), azo compound, organic peroxide, or the like. The antioxidant is, for example, a reducing agent, such as mercaptan, ascorbic acid, or polyphenol. However, the disclosure is not limited thereto.

The disclosure also provides a method of producing a three-dimensional object by additive manufacturing that uses the above light-curing resin composition, including the following steps. First, the light-curing resin composition is formed and provided by a three-dimensional printing process. In following, heat treatment is performed to a molded object formed by the three-dimensional printing process for forming the three-dimensional object, and the three-dimensional object has a closed-cell hollow structure. In this embodiment, the heat treatment may include heating or microwave irradiation. In more detail, the treatment temperature of the heat treatment is, for example, approximately 100° C., to 200° C., and the treatment time is, for example, approximately 1 minute to 60 minutes. The temperature and time may be adjusted according to the used type of the expandable particles and the expansion temperature.

The disclosure also provides a three-dimensional object formed by the above method, and the three-dimensional object formed by the above method of producing the three-dimensional object by additive manufacturing has a closed-cell hollow structure. More specifically, a pore size of the closed-cell hollow structure is approximately 1 μm to 1000 μm, approximately 1 μm to 500 μm, or approximately 1 μm to 200 μm, for example. The density of the three-dimensional object is less than 1 g/cm$^3$, less than 0.5 g/cm$^3$, or less than 0.2 g/cm$^3$, for example.

Hereinafter, experimental examples are used to describe in detail the light-curing resin composition, the three-dimensional object, and the method of producing the three-dimensional object by additive manufacturing in the disclosure. However, the following experimental examples are not intended to limit the disclosure.

Experimental Examples

For proving that the light-curing resin composition of the disclosure in the method of producing the three-dimensional object by additive manufacturing, after molded by the three-dimensional printing process, may directly perform secondary shaping by heating and expanding, and that the formed three-dimensional object may achieve the effect of volume enlargement and expansion, the following experimental examples are conducted.

Experimental Example 1: Preparation of Light-curing Resin Composition

According to composition proportions listed in Table 1. Table 2, and Table 3 below, the light-curing resin compositions of Example 1 to Example 19 and Comparative Example 1 to Comparative Example 6 are prepared. The unit for the composition proportions listed in Table 1. Table 2, and Table 3 is wt %. In more detail, during the preparation process, the photoinitiator, the acrylic oligomer, and the acrylic monomer were uniformly mixed, and then the expandable particles were added for mixing. In Table 1. Table 2, and Table 3, the acrylic oligomer used is urethane acrylate provided by LIANG MAO TECHNOLOGY, with the model numbers of LM-781T3 and LM-75PU; the bifunctional monomer used is provided by LIANG MAO TECHNOLOGY, with the model number of LM-D300M; the tetrafunctional acrylic monomer used is provided by LIANG MAO TECHNOLOGY, with the model number of LM-20TA; the monofunctional monomer used is provided by LIANG MAO TECHNOLOGY, with the model number of LM-A022; the expandable particles used are provided by MATSUMOTO YUSHI-SEIYAKU, with the model number of FN78D, the particle size of 10 μm to 80 μm, the Ts of approximately 120° C., the Tmax of approximately 160° C., and the true specific gravity after expansion of 0.02 to 0.05. Except for the chemicals mentioned above, all sources of the remaining chemicals are Tokyo Chemical Industry Co., Ltd. (TCI).

Experimental Example 2: Production of Three-dimensional Object by Additive Manufacturing The light-curing resin compositions of Example 1 to Example 19 and Comparative Example 1 to Comparative Example 6 were used to produce test objects by DLP equipment MiiCraft Profession 120 of Rays Optics. In following, the printed objects were put into an oven with a temperature of approximately 110° C., to 150° C., for 5 minutes before taken out. The objects might be enlarged in proportion to the original shape, and the objects had closed-cell hollow structures inside.

Experimental Example 3: Material Property Detection Method

Reference specification for measuring ultimate tensile strength, elongation at break, and tensile modulus: ASTM D412 and Die-C.

Equipment for measuring storage modulus: dynamic mechanical thermal analysis (DMA).

Reference specification for measuring hardness: ASTM D2240.

Calculation method of volume increase (%) after expansion: (volume after expansion-volume before expansion)/volume before expansion.

TABLE 1

| material | product name/constituent | Example 1 | Example 2 | Example 3 | Example 4 | Example 5 | Example 6 |
|---|---|---|---|---|---|---|---|
| acrylic oligomer | LM-781T3 | | | | | | |
| | LM-75PU | 46.5 | 46.5 | 46.5 | 55.5 | 55.5 | 46.5 |
| tetrafunctional acrylic monomer | LM-20TA | | | | | | |
| trifunctional acrylic monomer | tris[2-(acryloyloxy)ethyl] isocyanurate | | | | | | |
| monofunctional acrylic monomer | LM-A022 | | 10 | | | | |
| | LM-339 | 10 | | | 10 | | |
| | acryloyl morpholine | 16 | 16 | 26 | 16 | 16 | 16 |
| | isobornyl acrylate | 15 | 15 | 15 | 15 | 20 | 25 |
| difunctional acrylic monomer | LM-D300M | 9 | 9 | 9 | | 5 | 9 |
| photoinitiator | 2,4,6-trimethylbenzoyl diphenylphosphine oxide | 0.5 | 0.5 | 0.5 | 0.5 | 0.5 | 0.5 |
| | 2-hydroxy-2-methylpropiophenone | | | | | | 1 |
| expandable particle | FN78D | 25 | 25 | 25 | 18 | 18 | 14.5 |
| volume increase after expansion (%) | | 893 | 826 | 533 | 1116 | 741 | 518 |
| surface after expansion | | complete | complete | complete | complete | complete | complete |

| material | product name/constituent | Example 7 | Example 8 | Comparative Example 1 | Comparative Example 2 | Comparative Example 3 |
|---|---|---|---|---|---|---|
| acrylic oligomer | LM-781T3 | 10 | | | | |
| | LM-75PU | 25.5 | 25 | 46.5 | 46.5 | 46.5 |
| tetrafunctional acrylic monomer | LM-20TA | | | | | 9 |
| trifunctional acrylic monomer | tris[2-(acryloyloxy)ethyl] isocyanurate | | | 3 | 6 | |
| monofunctional acrylic monomer | LM-A022 | | | | | |
| | LM-339 | | 15 | | | |
| | acryloyl morpholine | 16 | 10 | 13 | 10 | 16 |
| | isobornyl acrylate | 36 | 47 | 25 | 25 | 25 |

TABLE 1-continued

| | | | | | | |
|---|---|---|---|---|---|---|
| difunctional acrylic monomer | LM-D300M | 9 | | 9 | 9 | |
| photoinitiator | 2,4,6-trimethylbenzoyl diphenylphosphine oxide | 0.5 | 1.5 | 0.5 | 0.5 | 0.5 |
| | 2-hydroxy-2-methylpropiophenone | | 1 | | | |
| expandable particle | FN78D | 14.5 | 70 | 12 | 12 | 12 |
| volume increase after expansion (%) | | 135 | 1380 | — | — | — |
| surface after expansion | | complete | complete | distorted and loose | distorted and loose | distorted and loose |

According to the experiment results in Table 1, Example 1 to Example 8 use the light-curing resin composition of the disclosure in the method of producing the three-dimensional object by additive manufacturing. Since the light-curing resin composition contains the photoinitiator, the acrylic oligomer, the acrylic monomer having monofunctional or difunctional groups, and the expandable particles, after molded by the three-dimensional printing process, the secondary shaping might be directly performed by heating and expanding, and the formed three-dimensional object might achieve the effect of volume enlargement and expansion. In contrast, the light-curing resin composition of Comparative Example 1 to Comparative Example 3 contains a trifunctional monomer or a tetrafunctional monomer, instead of the acrylic monomer having monofunctional or difunctional groups. Due to the excessively high cross-linking degree, which leads to a distorted and loose surface shape after expansion, the effect of volume increase and expansion after expansion of the disclosure cannot be achieved.

TABLE 2

| material | product name/constituent | Example 9 | Example 10 | Example 11 | Example 12 | Comparative Example 4 | Comparative Example 5 |
|---|---|---|---|---|---|---|---|
| acrylic oligomer | LM-75PU | 10 | 20 | 40 | 60 | 80 | 90 |
| monofunctional acrylic monomer | isobornyl acrylate | 90 | 80 | 60 | 40 | 20 | 10 |
| photoinitiator | 2,4,6-trimethylbenzoyl diphenylphosphine oxide) | 0.5 | 0.5 | 0.5 | 0.5 | 0.5 | 0.5 |
| expandable particle | FN78D | 22.2 | 22.2 | 22.2 | 22.2 | 22.2 | 22.2 |
| volume increase after expansion (%) | | 700 | 533 | 383 | 280 | 244 | 211 |
| surface after expansion | | complete | complete | complete | complete | cracked | cracked |
| content of acrylic oligomer (wt %) based on total weight of acrylic oligomer and acrylic monomer | | 10 | 20 | 40 | 60 | 80 | 90 |

According to the experiment results in Table 2, Example 9 to Example 12 use the light-curing resin composition of the disclosure, where the content of the acrylic oligomer is less than 80 wt % based on the total weight of the acrylic oligomer and the acrylic monomer. In contrast, in the light-curing resin composition of Comparative Example 4 to Comparative Example 5, based on the total weight of the acrylic oligomer and the acrylic monomer, the content of the acrylic oligomer is more than 80 wt %, and the heated material is unlikely to have a complete appearance, or has low expansion ratio, and generates cracks on the surface after expansion.

TABLE 3

| material | product name/constituent | Comparative Example 6 | Example 13 | Example 14 | Example 15 | Example 16 | Example 17 | Example 18 | Example 19 |
|---|---|---|---|---|---|---|---|---|---|
| acrylic oligomer | LM-75PU | 47 | 47 | 47 | 47 | 47 | 47 | 47 | 47 |
| monofunctional acrylic monomer | acryloyl morpholine | | | | | | | | 44 |
| | isobornyl acrylate | | 11 | | | 22 | 33 | 44 | |
| | LM-A022 | | | 11 | | | | | |
| | LM-339 | | | | 11 | | | | |
| difunctional acrylic monomer | LM-D300M | 53 | 42 | 42 | 42 | 31 | 20 | 9 | 9 |
| photoinitiator | 2,4,6-trimethylbenzoyl diphenylphosphine oxide | 0.5 | 0.5 | 0.5 | 0.5 | 0.5 | 0.5 | 0.5 | 0.5 |
| expandable particle | FN78D | 22.2 | 22.2 | 22.2 | 22.2 | 22.2 | 22.2 | 22.2 | 22.2 |
| volume increase after expansion (%) | | 19 | 41 | 37 | 44 | 105 | 211 | 238 | 180 |
| surface after expansion | | complete | complete | complete | complete | complete | complete | complete | complete |
| content of acrylic oligomer (wt %) based on total weight of acrylic oligomer and acrylic monomer | | 47 | 47 | 47 | 47 | 47 | 47 | 47 | 47 |

TABLE 3-continued

| material | product name/constituent | Comparative Example 6 | Example 13 | Example 14 | Example 15 | Example 16 | Example 17 | Example 18 | Example 19 |
|---|---|---|---|---|---|---|---|---|---|
| content proportion of difunctional monomer (%) based on total content of acrylic monomer | | 100 | 79 | 79 | 79 | 58 | 38 | 17 | 17 |

According to the experiment results in Table 3, Example 13 to Example 19 use the light-curing resin composition of the disclosure, where the content proportion of the difunctional monomer is less than 80 wt % based on the total content of the acrylic monomer. Therefore, the volume of the three-dimensional object may be enlarged after heat treatment (the ratio of volume increase>30%), and the appearance of the object is complete. In contrast, in the light-curing resin composition of Comparative Example 6, based on the total content of the acrylic monomer, the content proportion of the difunctional monomer is more than 80 wt %. Therefore, the proportion of the increased volume after expansion is relatively low.

Experimental Example 4: Evaluation of Expansion Ratio, Strength, and Elongation after Expansion Table 4 lists relevant information of different expandable particles that may be used in the disclosure. Table 5 lists expansion ratio, ultimate tensile strength, elongation at break, and tensile modulus of Example 1, Example 2, and Example 3 before and after expansion. According to Table 5, formula control allows the material to not only maintain the original shape after expansion but also have a certain strength and elongation under high expansion stretching ratio. Rn is a light-curing resin composition in which the total weight (of an acrylic oligomer and an acrylic monomer)/expandable particle weight=n. For example, R3 is a light-curing resin composition in which the total weight (of an acrylic oligomer and an acrylic monomer)/expandable particle weight-3, and R4.55 is a light-curing resin composition in which the total weight (of an acrylic oligomer and an acrylic monomer)/expandable particle weight=4.55.

TABLE 4

| used expandable particles (model number) | manufacturer | particle size (μm) | Ts (°C.) | Tmax (°C.) | true specific gravity after expansion |
|---|---|---|---|---|---|
| FN78D | MATSUMOTO YUSHI-SEIYAKU | 10-80 | ~120 | ~160 | 0.02-0.05 |
| MS145D | DONGJIN SEMICHEM | 13 ± 4 | 106 ± 6 | 140 ± 5 | 0.02-0.025 |
| EML101 | SEKISUI CHEMICAL | 12-18 | 115-130 | 155-175 | 0.017 ± 0.005 |
| EHM303 | SEKISUI CHEMICAL | 24-34 | 120-130 | 160-170 | 0.016 ± 0.005 |

TABLE 5

| | proportion of expandable particles in total (wt %) | expansion ratio @ 130° C. (volume %) | ultimate tensile strength (Mpa) | elongation at break (%) | tensile modulus |
|---|---|---|---|---|---|
| Example 1-R3-before expansion | 25 | | 2.75 ± 0.2 | 269 ± 53.9 | 53.34 ± 0.7 |
| Example 1-R3 after expansion | 25 | 893.84 | 1.35 ± 0.1 | 37.43 ± 2.0 | 13.09 ± 0.8 |
| Example 2-R3 before expansion | 25 | 0 | 2.6 ± 0.1 | 271.3 ± 4.1 | 31.0 ± 8.8 |
| Example 2-R3 after expansion | 25 | 826.10 | 1.4 ± 0 | 42.34 ± 3.1 | 15.0 ± 2.1 |
| Example 3-R4.55 before expansion | 18 | 0 | 4.05 ± 0.15 | 105.9 ± 41.6 | 153.2 ± 33.2 |
| Example 3-R4.55 after expansion | 18 | 533.16 | 1.65 ± 0.05 | 47.2 ± 6.3 | 19.4 ± 0.6 |

Table 6 and Table 7 respectively list the expansion ratio, ultimate tensile strength, elongation at break, and tensile modulus of adjusting the proportions of the added expandable particles in Examples 4 and 5 before and after expansion. Example 4 and Example 5 in which the proportions of the added expandable particles are adjusted are represented by, for example, Example 4-R3 to Example 4-R10, Example 5-R4.55, and Example 5-R10. R3 is the light-curing resin composition in which the total weight (of the acrylic oligomer and the acrylic monomer)/expandable particle weight-3. According to the results in Table 6 and Table 7,10 adjusting the proportion of the added particles may control the expansion ratio of the object after expansion.

TABLE 6

| | proportion of expandable particles in total (wt %) | expansion ratio @ 130° C. (volume %) | ultimate tensile strength (Mpa) | elongation at break (%) | tensile modulus |
|---|---|---|---|---|---|
| Example 4-R3 before expansion | 25 | 0 | 2 ± 0 | 371.6 ± 0.9 | 22.73 ± 1.1 |
| Example 4-R3 after expansion | 25 | 1116.70 | 0.95 ± 0.15 | 40.52 ± 1.7 | 9.6 ± 1.5 |
| Example 4-R4.55 before expansion | 18 | 0 | 2.85 ± 0.05 | 395.26 ± 69.2 | 30.85 ± 6.75 |
| Example 4-R4.55 after expansion | 18 | 700.00 | 1.4 ± 0.1 | 63.97 ± 0.88 | 12.12 ± 0.95 |
| Example 4-R7.3 before expansion | 12 | 0 | 4.3 ± 0.1 | 538.34 ± 19.3 | 32.85 ± 13.9 |
| Example 4-R7.3 after expansion | 12 | 533.16 | 1.45 ± 0.05 | 80.76 ± 9.16 | 16.3 ± 0.2 |
| Example 4-R10 before expansion | 9 | 0 | 4.8 ± 0.1 | 469.72 ± 3.38 | 57.36 ± 2.64 |
| Example 4-R10 after expansion | 9 | 435.94 | 1.4 ± 0 | 79.6 ± 3.59 | 18.54 ± 2.67 |

TABLE 7

| | content of expandable particles in total (wt %) | expansion ratio @ 130° C. (volume %) | ultimate tensile strength (Mpa) | elongation at break (%) | tensile modulus |
|---|---|---|---|---|---|
| Example 5-R4.55 before expansion | 18 | 0 | 3.2 ± 0 | 206.6 ± 48.6 | 50.45 ± 6.3 |
| Example 5-R4.55 after expansion | 18 | 741.49 | 2 ± 0.1 | 65.7 ± 4.3 | 21.2 ± 1.1 |
| Example 5-R10 before expansion | 9 | 0 | 5.35 ± 0.25 | 315.40 ± 10.35 | 67.7 ± 2.4 |
| Example 5-R10 after expansion | 9 | 409.60 | 2.45 ± 0.05 | 94.98 ± 5.95 | 28.31 ± 2.95 |

Table 8 lists expansion ratio, ultimate tensile strength, elongation at break, and tensile modulus of the different expandable particles used in Example 6 after expansion.

TABLE 8

| types of used expandable particles | content proportion of expandable particles (wt %) | expansion ratio @ 130° C. (volume %) | ultimate tensile strength (Mpa) | elongation at break (%) | tensile modulus |
|---|---|---|---|---|---|
| FN78D | 14.5 | 518 (130° C./5 min) | 1.97 ± 0.05 | 61.96 ± 5.90 | 15.81 ± 0.95 |
| MS145D | 14.5 | 220 (140° C./5 min) | 1.10 ± 0.14 | 142.70 ± 12.48 | 5.10 ± 0.22 |
| EML101 | 14.5 | 299 (150° C./5 min) | 2.6 ± 0.29 | 163.53 ± 32.03 | 15.13 ± 1.10 |
| EHM303 | 14.5 | 491 (150° C./5 min) | 2.27 ± 0.05 | 115.4 ± 8.62 | 4.40 ± 0.42 |

Table 9 lists expansion ratio, hardness, and storage modulus after expansion of Example 7 in which the proportion of the added expandable particles is adjusted, and Example 7 in Table 9 employs EML101 instead as the expandable particles. Example 7 in which the proportion of the added expandable particles is adjusted is represented by, for example, Example 7-R6 to Example 7-R40. According to the results in Table 9, adjusting the proportion of the added particles may control the expansion ratio of the object after expansion.

TABLE 9

| | content proportion of expandable particles (wt %) | expansion ratio (volume %) @ 150° C. | hardness Shore A after expansion | storage modulus E' @ 50° C. (Mpa) | storage modulus E' @ 50° C. (Mpa) |
|---|---|---|---|---|---|
| Example 7-R6 | 14.5 | 135 | 89-91 | 181.9 | 35.21 |
| Example 7-R10 | 9.1 | 77 | ~98 | 283.4 | 50.00 |
| Example 7-R15 | 6.3 | 56 | ~98 | 365.9 | 55.06 |

TABLE 9-continued

| | content proportion of expandable particles (wt %) | expansion ratio (volume %) @ 150° C. | hardness Shore A after expansion | storage modulus E' @ 50° C. (Mpa) | storage modulus E' @ 50° C. (Mpa) |
|---|---|---|---|---|---|
| Example 7-R20 | 4.8 | 37 | ~98 | 463.3 | 60.47 |
| Example 7-R30 | 3.2 | 26 | ~98 | 508.2 | 59.67 |
| Example 7-R40 | 2.4 | 16 | ~98 | 558.7 | 65.80 |

Table 10 lists expansion ratio and hardness after expansion of Example 8 in which the proportion of the added expandable particles is adjusted. Example 8 in which the proportion of the added expandable particles is adjusted is represented by, for example. Example 8-R1.5 to Example 8-R4. According to the results in Table 10, adjusting the proportion of the added particles may control the expansion ratio of the object after expansion.

TABLE 10

| | content proportion of expandable particles (wt %) | expansion ratio (volume %) | hardness Shore C after expansion |
|---|---|---|---|
| Example 8-R1.5 | 40.0 | 1380 | 35-45 C |
| Example 8-R1.7 | 37.0 | 1291 | 35-45 C |
| Example 8-R2 | 33.3 | 1198 | 35-45 C |
| Example 8-R3 | 25.0 | 922 | 40-50 C |
| Example 8-R3.5 | 22.2 | 826 | 45-55 C |
| Example 8-R4 | 20.0 | 700 | 45-55 C |

In summary, the disclosure provides a light-curing resin composition, a three-dimensional object, and a method of producing the three-dimensional object by additive manufacturing. The three-dimensional printing process may achieve the function design of shoe materials and protective gears at different positions with three-dimensional structures without using molds, and may manufacture customized structure objects, which may better meet individual requirements. In addition, the light-curing resin composition of the disclosure includes the acrylic monomer which is a monofunctional monomer, a difunctional monomer, or a combination thereof, used in the method of producing the three-dimensional object by additive manufacturing of the disclosure. After molded by the three-dimensional printing process, the secondary shaping might be directly performed by heating and expanding. In this way, the time for three-dimensional printing, expanding, and shaping the object may be reduced to enhance the product production speed and even reduce the production costs. Formula control allows the material to not only maintain the original shape after expansion but also have a certain strength and elongation under high expansion stretching ratio, and adjusting the proportion of the added particles may further control the expansion ratio of the object after expansion. On the other hand, the three-dimensional object of the disclosure has enlarged volume, low density, and light weight, and may reduce body burden with the closed-cell hollow structure when worn.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A light-curing resin composition, comprising:
    a photoinitiator;
    an acrylic oligomer;
    an acrylic monomer, wherein the acrylic monomer is a combination of a monofunctional monomer and a difunctional monomer, based on a total content of the acrylic monomer, a content of the difunctional monomer is less than 80 wt %; and
    an expandable particle, having a hollow spherical shell structure, wherein a spherical shell material of the hollow spherical shell structure comprises acrylate or polyurethane, and air or small molecular hydrogen alkanes is comprised in the hollow spherical shell structure.

2. The light-curing resin composition according to claim 1, wherein a weight ratio of the acrylic oligomer to the acrylic monomer is less than 4.

3. The light-curing resin composition according to claim 1, wherein based on a total weight of the light-curing resin composition, a content of the photoinitiator is 0.05 wt % to 10 wt %, a content of the acrylic oligomer is 10 wt % to 80 wt %, a content of the acrylic monomer is 20 wt % to 99 wt %, and a content of the expandable particle is 1 wt % to 40 wt %.

4. The light-curing resin composition according to claim 1, wherein the acrylic oligomer comprises polyurethane acrylate, polyester acrylate, or epoxy acrylate.

5. A method of producing a three-dimensional object by additive manufacturing, comprising:
    providing the light-curing resin composition of claim 1, molded by a three-dimensional printing process; and
    performing a heat treatment to a molded object molded by the three-dimensional printing process to form a three-dimensional object, wherein the three-dimensional object has a closed-cell hollow structure.

6. The method of producing the three-dimensional object by additive manufacturing according to claim 5, wherein the heat treatment comprises heating or microwave irradiation.

7. The method of producing the three-dimensional object by additive manufacturing according to claim 5, wherein a treatment temperature of the heat treatment is 100° ° C., to 200° C., and a treatment time is 1 minute to 60 minutes.

8. A method of producing a three-dimensional object by additive manufacturing, comprising:
    providing the light-curing resin composition of claim 2, molded by a three-dimensional printing process; and
    performing a heat treatment to a molded object molded by the three-dimensional printing process to form a three-dimensional object, wherein the three-dimensional object has a closed-cell hollow structure.

9. A method of producing a three-dimensional object by additive manufacturing, comprising:
    providing the light-curing resin composition of claim 3, molded by a three-dimensional printing process; and
    performing a heat treatment to a molded object molded by the three-dimensional printing process to form a three-dimensional object, wherein the three-dimensional object has a closed-cell hollow structure.

10. A method of producing a three-dimensional object by additive manufacturing, comprising:
    providing the light-curing resin composition of claim 4, molded by a three-dimensional printing process; and
    performing a heat treatment to a molded object molded by the three-dimensional printing process to form a three-dimensional object, wherein the three-dimensional object has a closed-cell hollow structure.

11. A three-dimensional object, formed by the method of producing the three-dimensional object by additive manufacturing according to claim 5, wherein the three-dimensional object has a closed-cell hollow structure.

12. The three-dimensional object according to claim 11, wherein a pore size of the closed-cell hollow structure is 1 μm to 1000 μm.

13. The three-dimensional object according to claim 11, wherein a density of the three-dimensional object is less than 1 g/cm$^3$.

14. A three-dimensional object, formed by the method of producing the three-dimensional object by additive manufacturing according to claim 6, wherein the three-dimensional object has a closed-cell hollow structure.

* * * * *